Figure 2:
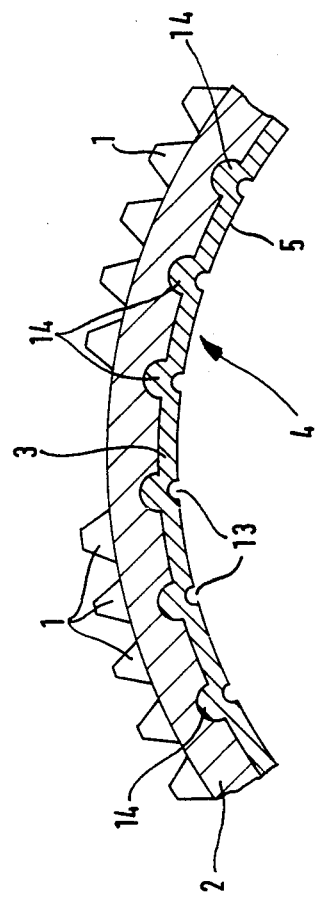

United States Patent [19]

Gramberger et al.

[11] Patent Number: 4,917,743
[45] Date of Patent: Apr. 17, 1990

[54] METHOD FOR MANUFACTURING A FRICTION RING HAVING A CONICAL OR CYLINDRICAL FRICTION SURFACE

[76] Inventors: Johann Gramberger, Hauptschulstrasse 26, A-4902 Wolfsegg; Ferdinand Mairhofer, Moosbergweg 41, A-4810 Gmunden, both of Austria

[21] Appl. No.: 157,652

[22] Filed: Feb. 18, 1988

[30] Foreign Application Priority Data

Feb. 21, 1987 [DE] Fed. Rep. of Germany ....... 3705658

[51] Int. Cl.⁴ .............................................. B32B 18/00
[52] U.S. Cl. ................................. 156/89; 192/107 M; 264/60; 264/62; 156/245; 156/293
[58] Field of Search .................. 156/89, 293, 294, 245; 428/181, 239, 279, 287; 264/60, 62; 228/120, 122, 903; 29/527.4; 192/53 F, 107 M; 419/5, 8

[56] References Cited

U.S. PATENT DOCUMENTS

| | | | |
|---|---|---|---|
| 2,395,189 | 2/1946 | Lapsley et al. | 192/107 |
| 2,784,112 | 3/1957 | Nicholson | 264/60 |
| 3,037,860 | 6/1962 | Masterson et al. | 192/107 M |
| 3,306,401 | 2/1967 | Dasse | 188/251 |
| 3,698,526 | 10/1972 | Berges | 192/107 M |

FOREIGN PATENT DOCUMENTS

| | | | |
|---|---|---|---|
| 742954 | 9/1966 | Canada | 156/89 |
| 761417 | 9/1954 | United Kingdom . | |

Primary Examiner—Caleb Weston
Attorney, Agent, or Firm—Kokjer, Kircher, Bradley, Wharton, Bowman & Johnson

[57] ABSTRACT

In order to enable a friction ring comprising a supporting ring (2) and a sintered friction lining (4) to be produced without sintering the friction lining (4) to an intermediate carrier, one initially forms a self-supporting shaped strip (5) from a compacted dry powder material (1), by presintering or bonding using a bonding agent, whereafter the shaped strip (5) is pressed into the supporting ring (2) and the friction lining (4) is produced by final sintering.

9 Claims, 1 Drawing Sheet

U.S. Patent   Apr. 17, 1990   4,917,743

METHOD FOR MANUFACTURING A FRICTION RING HAVING A CONICAL OR CYLINDRICAL FRICTION SURFACE

The present invention relates to a method for manufacturing a friction ring having a conical or cylindrical friction surface, in which a friction lining that has been prefabricated from a sintering material, is connected with a supporting ring.

The pores encountered in the material of sintered bodies provide certain advantages when such bodies are used for the manufacture of friction linings. In the case of friction discs having a plane friction surface, one can profit of these advantages easily because the dry powder, which consists of several components, can be exactly metered out upon the disc body and then sintered and compacted by a series of procedural steps. The sintering process leads in this case to a solid bond between the friction lining and the disc body. However, friction rings of the type used in synchronizing devices of manual transmissions, friction clutches or friction brakes, are usually not provided with friction linings consisting of a sintered material because the process of applying the dry powder upon the cylindrical or conical friction surface is already connected with problems and because it is not possible to compact the powder layer by an axially moving pressure piston. In order to enable friction locking rings to be nevertheless provided with the dry-powder friction lining, it has been previously known (German Patent Specification No. 34 17 813) to sinter the friction lining in the conventional manner upon a plane carrier sheet, to bend the carrier sheet thereafter to adapt it to the geometric shape of the friction surface of the friction locking ring, and to connect it thereafter with the supporting ring by spot-welding. However, it is a drawback of these known friction rings that the spot-welding process leads to non-uniform thermal loading of the supporting ring, with the consequential risk of thermal stresses, that the friction lining cannot be reworked exactly between the welding points due to the resilience carrier sheet and that no close production tolerances can be observed in practice because for a given dimension of the supporting ring the thickness of the dry powder material is reduced by the thickness of the carrier sheet.

Now, it is the object of the present invention to avoid these drawbacks and to provide a method for manufacturing a friction ring of the type described above by which the supporting ring can be provided in a simple manner with a sintered friction lining, while there is no need for applying the sintered material upon a separate carrier and connecting the latter thereafter with the supporting ring.

This object is achieved according to the invention by the steps of forming initially at least one self-supporting shaped strip capable of being subjected to pressure, by pre-sintering or bonding using a bonding agent, pressing the shaped strip into the supporting ring, ad producing the friction lining thereafter by sintering.

Due to the fact that a self-supporting shaped strip exhibiting the necessary strength for the further processing steps can be produced from the pre-determined amount of dry powder by sintering or bonding using a bonding agent, no separate carrier sheet is required for the manufacture of the friction lining and the shaped strip that has been pre-fabricated from the dry powder can be pressed directly into the supporting ring and sintered together with the later while being in intimate contact therewith. This ensures a full-surface connection between the friction lining and the supporting ring which does not only withstand all stresses to which it may be exposed, but which in addition avoids any resilience which heretofore was encountered between the connection points, and this leads directly to improved production tolerances during reworking of the frictional surface. In addition, when determining the thickness of the friction lining, it is no longer necessary to allow for the thickness of the carrier sheet so that a correspondingly greater thickness of the dry powder layer can be selected for the production of the self-supporting shaped strip. This permits the density of the dry powder and, accordingly, the desired porosity to be controlled with much greater accuracy because irregularities occurring during application of the dry powder have less detrimental effects with layers of greater thickness. It has to be considered in this connection that the dry powder layer applied to a carrier must of course be compacted to the desired thickness. Finally, working displacement grooves for a lubricant into the friction lining is also rendered easier when the latter offers increased thickness.

The fact that without a carrier the thickness of the self-supporting shaped strip is greater by the thickness of the carrier sheet provides the possibility to give the shaped strip itself a multi-layer design, for example to provide the side facing the supporting ring with a layer of a bonding agent so that the conditions existing at the transition between the friction lining and the supporting ring can be allowed for especially by the bonding agent layer.

The friction lining which may either be composed of individual segments or formed by a shaped strip corresponding to the circumferential length of the friction surface may be produced in a simple manner by pre-sintering the dry powder after application thereof upon a plane carrier face, cutting and bending the self-supporting shaped strip so produced and pressing it finally into the supporting ring for final sintering. Bending of the shaped strips may be effected advantageously by feeding the cut plane strips through bending rollers.

Another possibility of bending the plane pre-fabricated shaped strips to adapt them to the required geometrical shape of the frictional surface consists in bending the pre-cut shaped strips while they are pressed into the supporting ring which means in practice that the strips must have the form of segment strips. Such a procedural step then eliminates the need for bending the pre-cut strips separately. Particularly favorable conditions are created when the supporting ring is likewise sintered and when the pre-fabricated shaped strips are inserted into the molding press for the supporting ring so that they are formed and, subsequently, sintered together with the supporting ring during compression of the latter. The greater the number of strip segments used for forming the friction lining, the easier is the molding operation.

Figure 1:
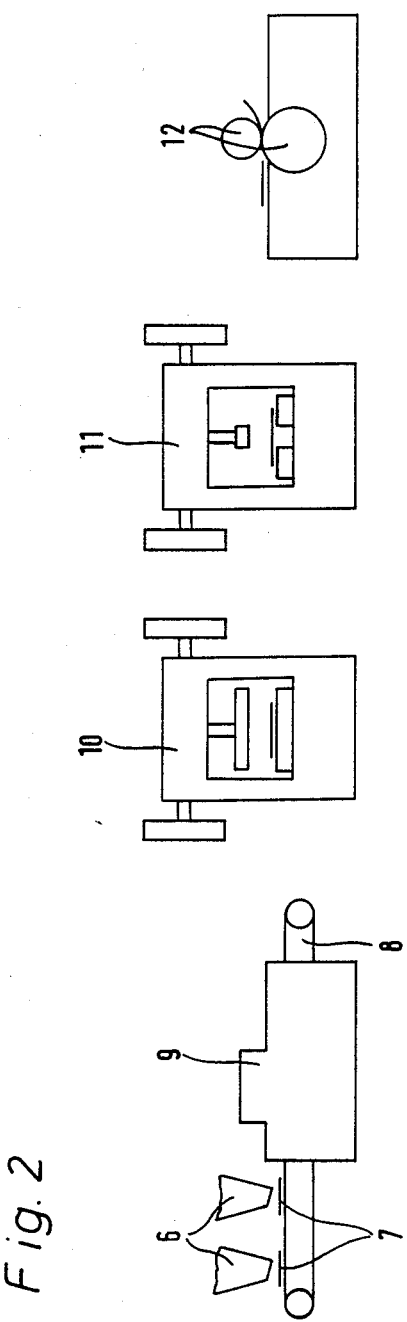

The method according to the invention for manufacturing a friction ring having a conical and a cylindrical friction surface will now be described in greater detail with reference to the drawing in which FIG. 1 shows a cross-section through a section of a friction ring comprising a sintered friction lining, manufactured according to the method of the invention; and FIG. 2 shows a schematic block diagram of a system for producing the shaped strip required for the friction lining.

FIG. 1 shows a friction ring, being a synchronizing ring of a synchronizing mechanism in a manual transmission of a motor vehicle. The synchronizing ring is provided with teeth at its outer circumferential surface and has a inner circumferential frictional surface. However, it does without saying that the synchronizing ring may also be provided with teeth at an inner circumferential surface and may be provided with a frictional surface at an outer circumferential surface. Further, frictional circumferential surfaces and/or teeth may be provided at both inner and outer circumferential surfaces.

In the embodiment shown in FIG. 1, the synchronizing ring comprises a supporting ring 2 made of metal or of a sinter powder material. The supporting ring 2 may be manufactured by forging, casting, sintering, or otherwise, as known in the art. To provide a frictional circumferential surface, the supporting ring 2 is provided with a friction lining 4 made of sinter powder material. During the process of manufacture, sinter powder is first molded and compressed to provide a strip-shaped sinter powder member. The sinter powder member is then pre-sintered to provide a self-supporting and mechanically stable friction member. The friction member is then cut to shape and put into the supporting ring such that an outer circumferential surface of the friction member comes into contact with a corresponding inner circumferential surface of the supporting ring 2. The supporting ring 2 is then sintered together with the friction member such that the friction lining 4 is formed as can be seen in FIG. 1 where the friction member 5 snugly fits into the supporting ring 2 and is there held mechanically stable due to the sintering connection of the friction member and the supporting ring 2.

In case the supporting ring 2 is made of sintering powder, too, one can also use a pre-sintered supporting ring 2 and a pre-sintered friction member, put these two elements together and sinter them thereafter.

Referring now to FIG. 2, for producing the shaped strip 5 one initially spreads the dry powder by a corresponding dispensing system 6 upon a carrier surface 7 and transports the latter by means of a conveyor 8 through a sintering oven 9 where the dry powder, which has been applied in the form of a strip, is pre-sintered to obtain a self-supporting shaped strip of sufficient strength to permit further processing. The said strip is then compacted in a press 10 and cut to the proper dimensions by means of a punching device 11. Having been prepared in this manner, the shaped strip 5 can then be fed through bending rollers 12 for being bent to match the annular surface 3 so that the preshaped strips 5 can then be pressed into the supporting ring 2 and completely sintered, being simultaneously connected in this manner to the supporting ring 2. Simultaneously with the pressing operation by which the shaped strip 5 is pressed into the supporting ring 2, lubricant grooves 13 may be worked into the friction lining 4. This is done by urging the material of the shaped strips 5 into corresponding groove-like recesses 14 provided in the supporting ring 2. One maintains in this manner the full-surface connection between the supporting ring 2 and the friction lining 4.

After sintering of the shaped strips 5, the friction lining 4 may be additionally machined to meet particularly high demands regarding accuracy.

The shaped strips 5 may be of single or multi-layer design. The latter can be achieved easily by causing the dry powder to be applied on the carriers 7 in layers, by succeeding dispensing devices 6, in which case even different porosities of the individual layers can be obtained by different degrees of compaction. The multilayer design of the shaped strips 5 may help achieve a particularly intimate connection between the supporting ring 2 and the shaped strip 5.

Instead of pre-sintering the shaped strips 5 in a sintering oven 9, the dry powders may also be bonded to form a sufficiently strong shaped strip by suitable bonding agents. In fact, it only has to be ensured that the shaped strips exhibit a density sufficient to enable them to be pressed into the supporting ring 2. Sintering of the friction lining 4 is effected after the shaped strips 5 have been pressed into the supporting ring 2.

It is of course understood that the shaped strips need not necessarily be plane. If the circumferential length of the segment-shaped strips remains within certain limits, the dry powder may also be spread upon a correspondingly curved carrier surface because in this case no particular problems are encountered with the necessary compacting of the sintered bodies.

We claim:

1. A method for manufacturing a frictional ring having a circumferential frictional surface, the method comprising the steps of:

manufacturing a ring-shaped supporting member having a first circumferential supporting surface;

molding and compressing a sintering powder to provide a strip-shaped sinter powder member having a second circumferential supporting surface complementary to said first circumferential supporting surface;

pre-sintering said sinter powder member to provide a self-supporting mechanically stable friction member;

pressing said friction member into said supporting member with said first and second circumferential supporting surfaces adjoining each other;

sintering said friction member with said second circumferential supporting surface onto said first circumferential supporting surface of said supporting member.

2. The method of claim 1, wherein said circumferential frictional surface is of conical shape.

3. The method of claim 1, wherein said circumferential frictional surface is of cylindrical shape.

4. The method of claim 1, wherein said circumferential frictional surface is an outer circumferential surface.

5. The method of claim 1, wherein said circumferential frictional surface is an inner circumferential surface.

6. The method of claim 1, wherein an adhesion layer is provided on said second circumferential supporting surface of said strip-shaped sinter powder member.

7. The method of claim 1, wherein said compressing and pre-sintering of said sinter powder member is performed on a plane support and said self-supporting mechanically stable strip-shaped friction member is cut to shape and bent thereafter.

8. The method of claim 7, wherein said bending of said cut-to-shape strip is performed by means of bending rollers.

9. The method of claim 7, wherein said bending of said cut-to-shape strip is performed during pressing said strip into said supporting ring.

* * * * *